(12) United States Patent
Tsutsui et al.

(10) Patent No.: US 11,499,575 B2
(45) Date of Patent: Nov. 15, 2022

(54) HYDRAULIC CYLINDER DEVICE

(71) Applicant: Showa Corporation, Gyoda (JP)

(72) Inventors: Hayato Tsutsui, Fukuroi (JP); Genki Yanagidate, Fukuroi (JP); Kohei Sunami, Fukuroi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 12 days.

(21) Appl. No.: 16/599,818

(22) Filed: Oct. 11, 2019

(65) Prior Publication Data

US 2020/0400131 A1 Dec. 24, 2020

(30) Foreign Application Priority Data

Jun. 20, 2019 (JP) .............................. JP2019-114946

(51) Int. Cl.
*F15B 15/18* (2006.01)
*F15B 11/08* (2006.01)
*F16K 17/04* (2006.01)

(52) U.S. Cl.
CPC .............. *F15B 15/18* (2013.01); *F15B 11/08* (2013.01); *F16K 17/0486* (2013.01)

(58) Field of Classification Search
CPC .......... F03C 1/002; F03C 1/013; F03C 1/001; F03C 1/007; F03C 1/0073; F15B 15/18; F15B 11/08; F15B 2211/20515; F15B 1/265; F15B 2211/20561; F15B 2211/27; F15B 2211/30505; F15B 2211/3051;
(Continued)

(56) References Cited

U.S. PATENT DOCUMENTS

| 2008/0047621 A1* | 2/2008 | Ittlinger ............... F16K 15/063 137/539 |
| 2015/0275928 A1* | 10/2015 | Tsutsui ................... F15B 15/18 60/471 |

(Continued)

FOREIGN PATENT DOCUMENTS

| CN | 203516291 U | 4/2014 |
| CN | 104389851 A | 3/2015 |
| JP | 2015-183649 A | 10/2015 |

OTHER PUBLICATIONS

Japanese Office Action dated Jan. 28, 2020 for the corresponding Japanese Patent Application No. 2019-114946.

*Primary Examiner* — Bryan M Lettman
(74) *Attorney, Agent, or Firm* — Leason Ellis LLP

(57) ABSTRACT

A hydraulic cylinder device includes: a pump; a valve body disposed so as to partition an inside of a chamber into chambers; and a non-return valve including a movable member, an elastic member and a support member. The movable member moves to open/close one opening portion that is an opening portion on the one chamber side in a case that forms a flow channel from the one chamber toward an exterior. The elastic member gives force to the movable member in a direction to close the one opening portion, and has one end portion supported by the movable member. The support member is disposed to close an opening portion on the exterior side in the case to support the other end portion of the elastic member, and has a through hole that serves as a throttle of the flow channel from the one chamber toward the exterior.

16 Claims, 12 Drawing Sheets

(58) Field of Classification Search
CPC ........ F15B 2211/329; F15B 2211/7053; F15B 13/027; F16K 17/0486; F16K 15/063; F04B 7/02
See application file for complete search history.

(56) References Cited

U.S. PATENT DOCUMENTS

| | | | |
|---|---|---|---|
| 2015/0275929 A1* | 10/2015 | Tsutsui | F04C 2/086 60/472 |
| 2015/0275930 A1* | 10/2015 | Tsutsui | F15B 11/028 60/472 |
| 2016/0167759 A1* | 6/2016 | Tsutsui | F04B 53/16 440/61 D |
| 2016/0257390 A1* | 9/2016 | Tsutsui | F02B 61/045 |
| 2016/0265358 A1* | 9/2016 | Saito | F04C 15/0046 |
| 2016/0265526 A1* | 9/2016 | Saito | F04C 2/18 |

\* cited by examiner

HYDRAULIC CYLINDER DEVICE

CROSS-REFERENCE TO RELATED APPLICATIONS

This application is based upon and claims the benefit of priority to Japanese patent application No. 2019-114946, filed on Jun. 20, 2019, the entire contents of which are incorporated herein by reference.

TECHNICAL FIELD

The present invention relates to a hydraulic cylinder device.

BACKGROUND ART

Recently, there has been proposed an apparatus for adjusting a tilt/trim angle of an outboard motor by use of oil pressure. In a case where the outboard motor is heavier in weight than an expected weight or air is mixed into a flow channel between a non-return valve communicating with an upper chamber of a cylinder device and the upper chamber, the apparatus may make jerky motion when the outboard motor which has been tilted up is put down. This arises because pressure in the aforementioned flow channel becomes too low to keep an upper chamber-side activation valve in a displaced state during retraction of the cylinder device, so that a non-return valve communicating with a lower chamber is open/closed repeatedly.

In order to suppress such jerky motion, a pump device described in PTL 1 is configured as follows. That is, the pump device includes a pump and a changeover valve which are provided integrally. The pump discharges hydraulic fluid. The changeover valve changes over a flow direction of the hydraulic fluid supplied to a first chamber or a second chamber of a cylinder device. The inside of the cylinder device is partitioned into the first chamber and the second chamber by a piston. The first chamber extends at an extension stroke and the second chamber extends at a retraction stroke. A throttle is formed in, of flow channels from the changeover valve, the flow channel connected to the second chamber. The throttle is narrower than the flow channel connected to the first chamber.

PTL 1: JP-A-2015-183649

A change in the shape of the flow channel at the throttled portion leads to a change in the way of the oil flow. Therefore, it is difficult to stabilize the effect of the throttle. For this reason, it is desirable that the shape of the flow channel at the throttled portion is unchanged in order to stabilize the effect of the throttle to thereby highly accurately suppress the aforementioned jerky motion. In addition, when such a component for throttling the flow channel with the cylinder device is provided separately from the hydraulic cylinder device or inside the hydraulic cylinder device, the number of components increases.

An object of the present invention is to provide a hydraulic cylinder device which can stabilize a throttle effect without increasing the number of components.

SUMMARY OF INVENTION

According to an aspect of the invention, there is provided a hydraulic cylinder device including: a pump that discharges hydraulic fluid; a valve body that is disposed so as to partition an inside of a chamber, into which the hydraulic fluid discharged from the pump flows, into chambers so that when pressure in one of the chambers on one side is higher than pressure in the other chamber on the other side, the valve body moves toward the other side; and a non-return valve that includes a movable member, an elastic member and a support member, the movable member that moves to open/close one opening portion that is an opening portion on the one chamber side in a case that forms a flow channel from the one chamber toward an exterior of the chamber, the elastic member that gives force to the movable member in a direction to close the one opening portion, the elastic member that has one end portion supported by the movable member, the support member that is disposed to close an opening portion on the exterior side in the case to support the other end portion of the elastic member, the support member that has a through hole that serves as a throttle of the flow channel from the one chamber toward the exterior.

According to the present invention, it is possible to stabilize a throttle effect without increasing the number of components.

DESCRIPTION OF EMBODIMENTS

Embodiments of the present invention will be described below in detail with reference to the accompanying drawings. Incidentally, the following embodiments are exemplary embodiments of the present invention. The present invention should not be limited to the following embodiments.

First Embodiment

Figure 1:
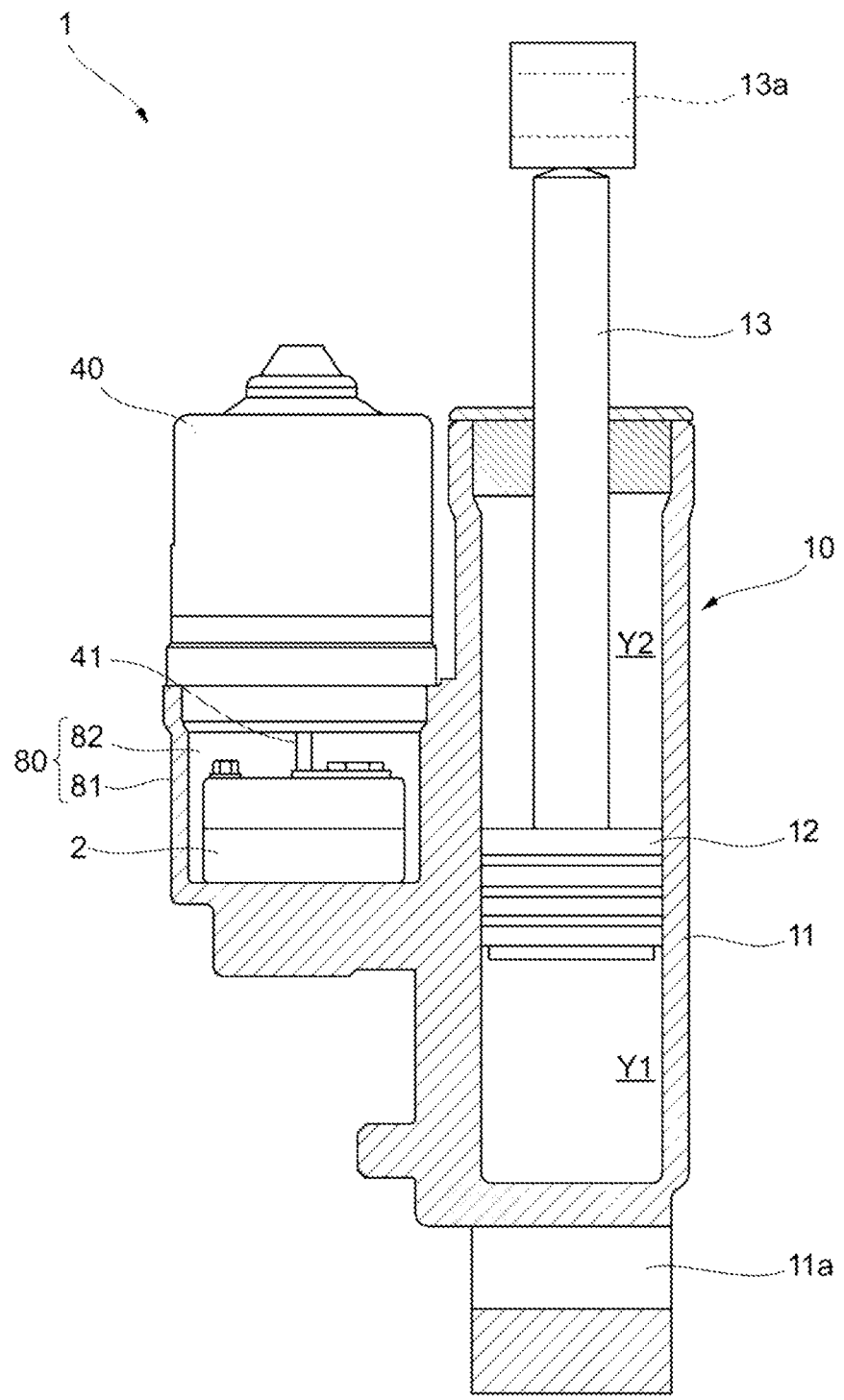
FIG. 1 is a view showing an example of a schematic configuration of a trim/tilt apparatus 1 according to a first embodiment.

FIG. 1 is a view showing an example of a schematic configuration of a trim/tilt apparatus 1 according to a first embodiment.

Figure 2:
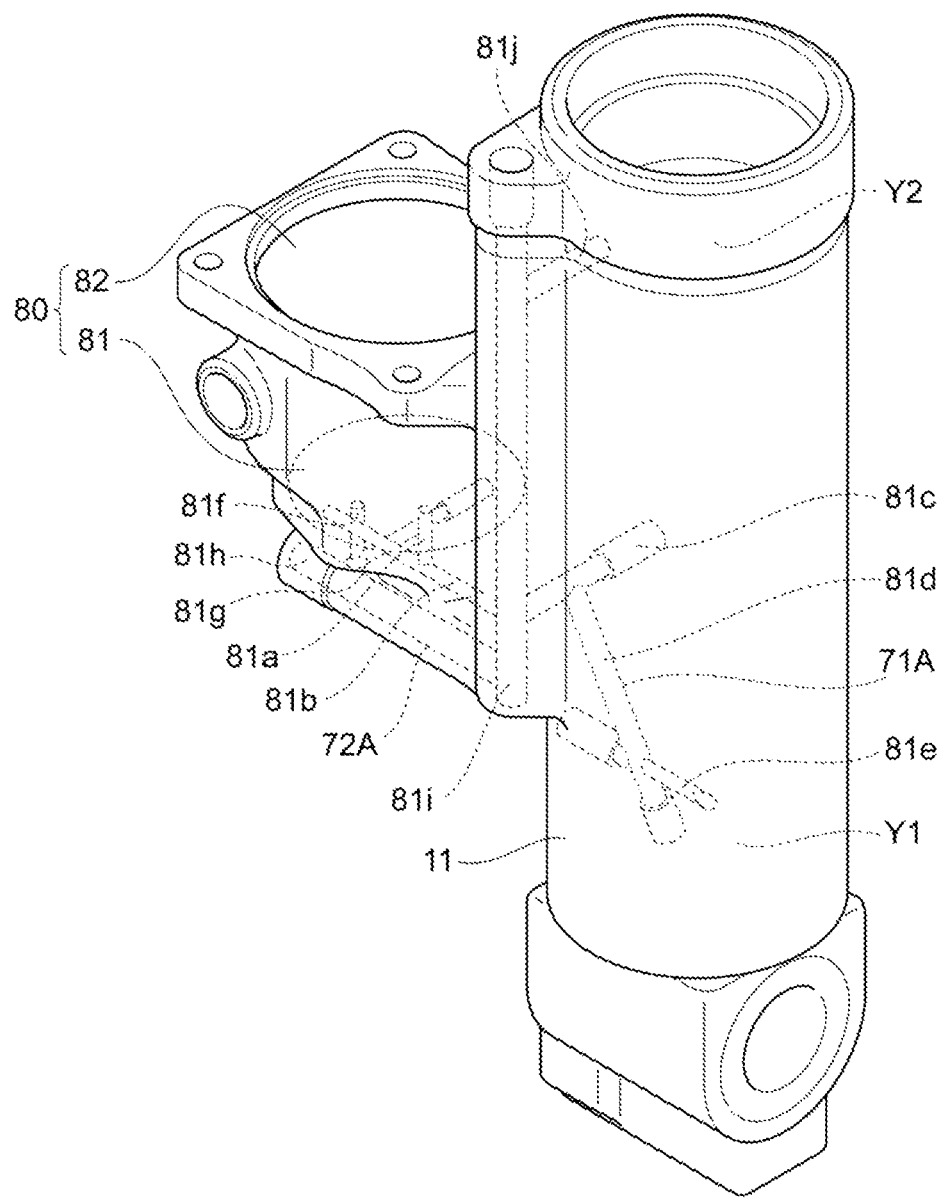
FIG. 2 is a perspective view showing an example of a housing 81 and a cylinder 11 of the trim/tilt apparatus 1.

FIG. 2 is a perspective view showing an example of a housing 81 and a cylinder 11 of the trim/tilt apparatus 1.

The trim/tilt apparatus 1 according to the first embodiment is provided with a cylinder device 10, a hydraulic cylinder device 2, a motor 40 and a tank 80. The cylinder device 10 extends/retracts due to oil sucked/discharged into/from the cylinder device 10. The oil serves as an example of hydraulic fluid. The hydraulic cylinder device 2 supplies the oil to the cylinder device 10. The motor 40 drives the hydraulic cylinder device 2. The tank 80 stores the oil.

The cylinder device 10, the motor 40 and the tank 80 may be illustrated to be the same as a cylinder device 10, a motor 40 and a tank 80 respectively described in PTL 1.

However, the hydraulic cylinder device 2 is different from a pump device 20 described in PTL 1 in that a first non-return valve 51e and a second non-return valve 52e belonging to the pump device 20 have different structures from those in the hydraulic cylinder device 2.

The trim/tilt apparatus 1 according to the first embodiment will be described below. In the trim/tilt apparatus 1 according to the first embodiment, members and parts having the same shapes and functions as those in a trim/tilt apparatus 100 described in PTL 1 will be given the same names and signs correspondingly and respectively, and detailed description thereof will be omitted.

(Cylinder Device 10)

As shown in FIG. 1, the cylinder device 10 is provided with the cylinder 11, a piston 12, and a piston rod 13.

In the cylinder device 10, the inside of the cylinder 11 is partitioned into a first chamber Y1 and a second chamber Y2 by the piston 12. When oil is supplied to the first chamber Y1, the cylinder device 10 extends. When oil is supplied to the second chamber Y2, the cylinder device 10 retracts. When the cylinder device 10 extends, oil is discharged from the second chamber Y2. When the cylinder device 10 retracts, oil is discharged from the first chamber Y1.

A pin hole 11a is formed in an end portion of the cylinder 11 so that a pin (not shown) to be connected to a stern bracket (not shown) of a watercraft propulsion machine (not shown) can be inserted into the pin hole 11a. On the other hand, a pin hole 13a is formed in an end portion of the piston rod 13 so that a pin (not shown) to be connected to a swivel case (not shown) of the watercraft propulsion machine can be inserted into the pin hole 13a.

(Tank 80)

The tank 80 has a housing 81 and a tank chamber 82. The housing 81 receives the hydraulic cylinder device 2. The tank chamber 82 is a space enclosed by the housing 81. The housing 81 may be illustrated to be formed integrally with the cylinder 11. In the housing 81 and the cylinder 11, a portion of a first chamber-side flow channel 71A and a portion of a second chamber-side flow channel 72A are formed as oil flow channels which connect the hydraulic cylinder device 2 with the first chamber Y1 and the second chamber Y2 of the cylinder device 10.

The portion of the flow channel 71A is formed by connecting a first hole 81a, a second hole 81b, a third hole 81c, a hole 81d and a hole 81e with one another in the housing 81.

The portion of the flow channel 72A is formed by connecting a fourth hole 81f, a fifth hole 81g, a sixth hole 81h, a hole 81i and a hole 81j with one another in the housing 81.

The hydraulic cylinder device 2 is fixed to a bottom of the tank chamber 81. Oil is stored in the tank chamber 82. The hydraulic cylinder device 2 is immersed in the oil.

(Motor 40)

As shown in FIG. 1, the motor 40 is fixed to the housing 81 so as to close an opening of the tank chamber 82. A driving shaft 41 of the motor 40 is linked to the hydraulic cylinder device 2 disposed in the tank chamber 82.

The hydraulic cylinder device 2 will be described later.

<Oil-Hydraulic Circuit of Trim/Tilt Apparatus 1>

Figure 3:
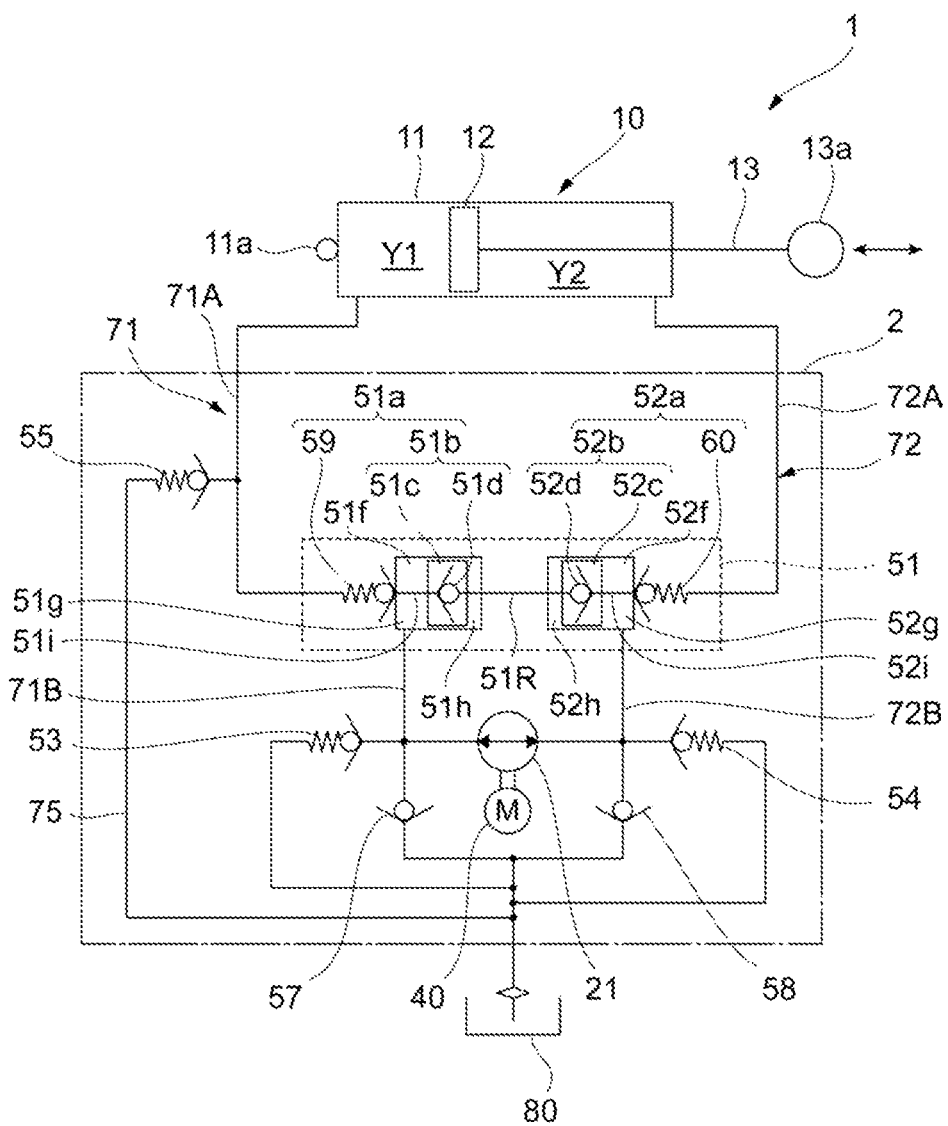
FIG. 3 is a diagram showing an oil-hydraulic circuit of the trim/tilt apparatus 1.

FIG. 3 is a diagram showing an oil-hydraulic circuit of the trim/tilt apparatus 1.

Figure 4:
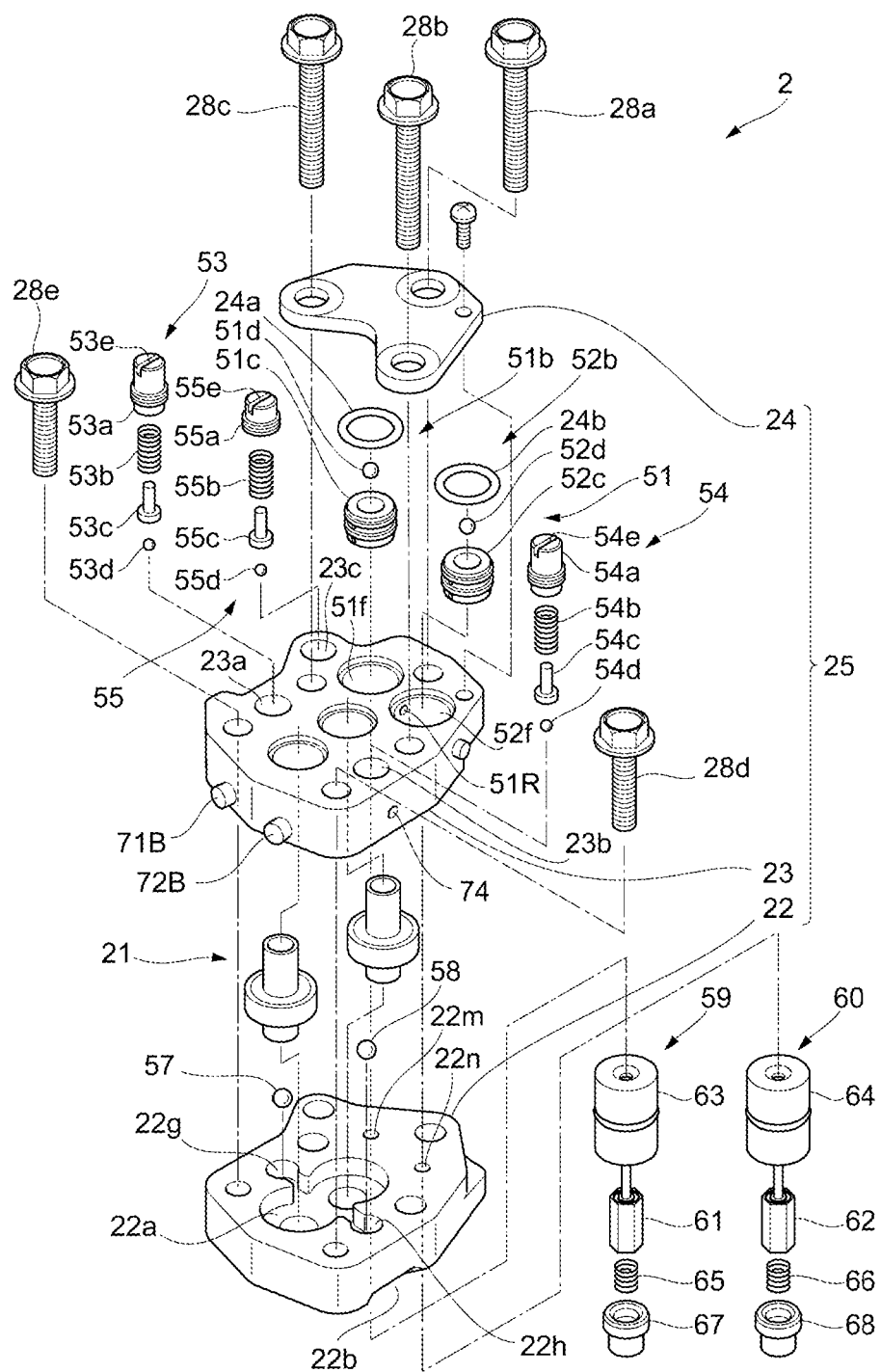
FIG. 4 is an exploded perspective view showing an example of constituent components of a hydraulic cylinder device 2.

FIG. 4 is an exploded perspective view showing an example of constituent components of the hydraulic cylinder device 2.

Figure 5:
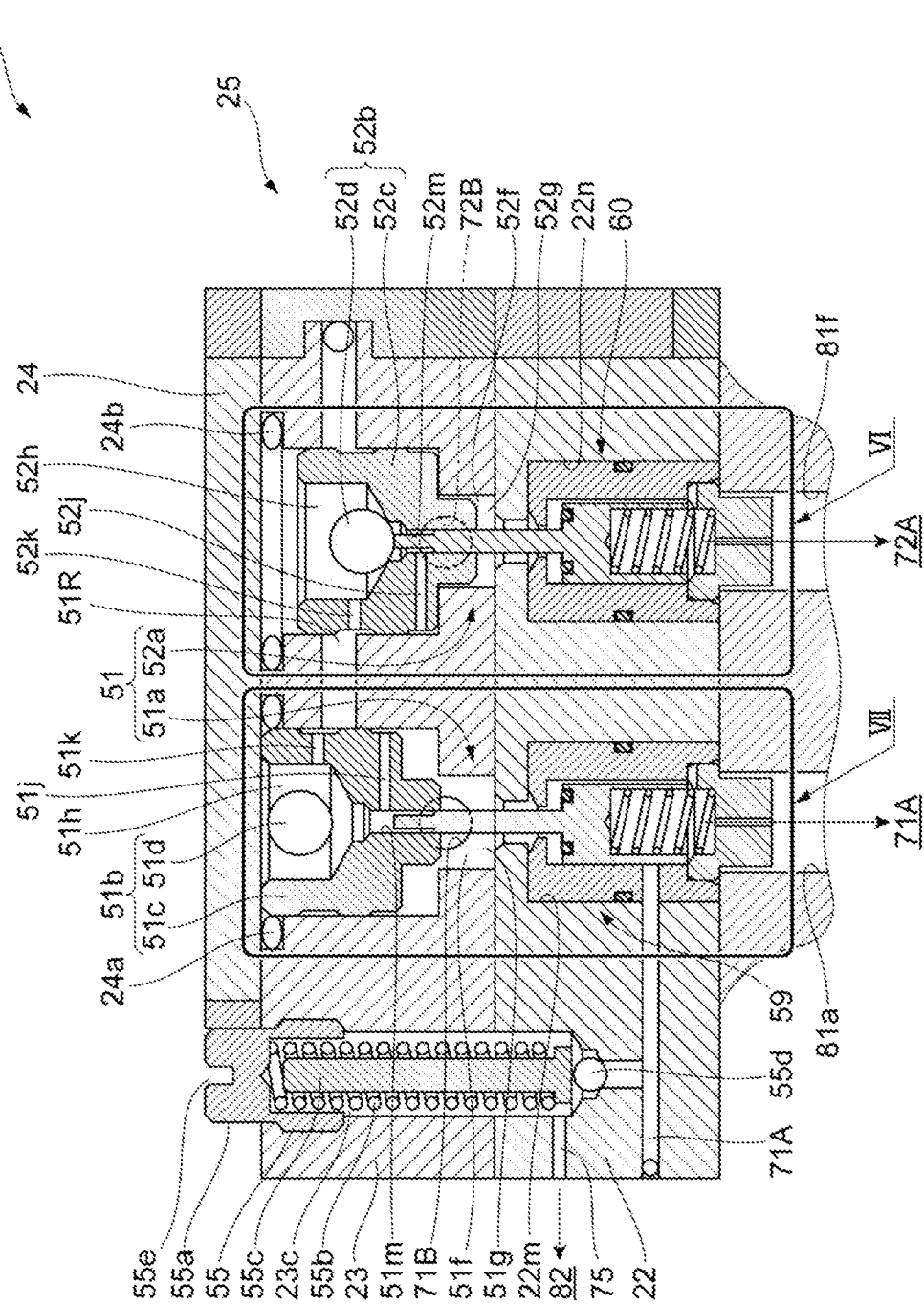
FIG. 5 is a sectional view showing an example of a section of the hydraulic cylinder device 2.

FIG. 5 is a sectional view showing an example of a section of the hydraulic cylinder device 2.

Figure 6:
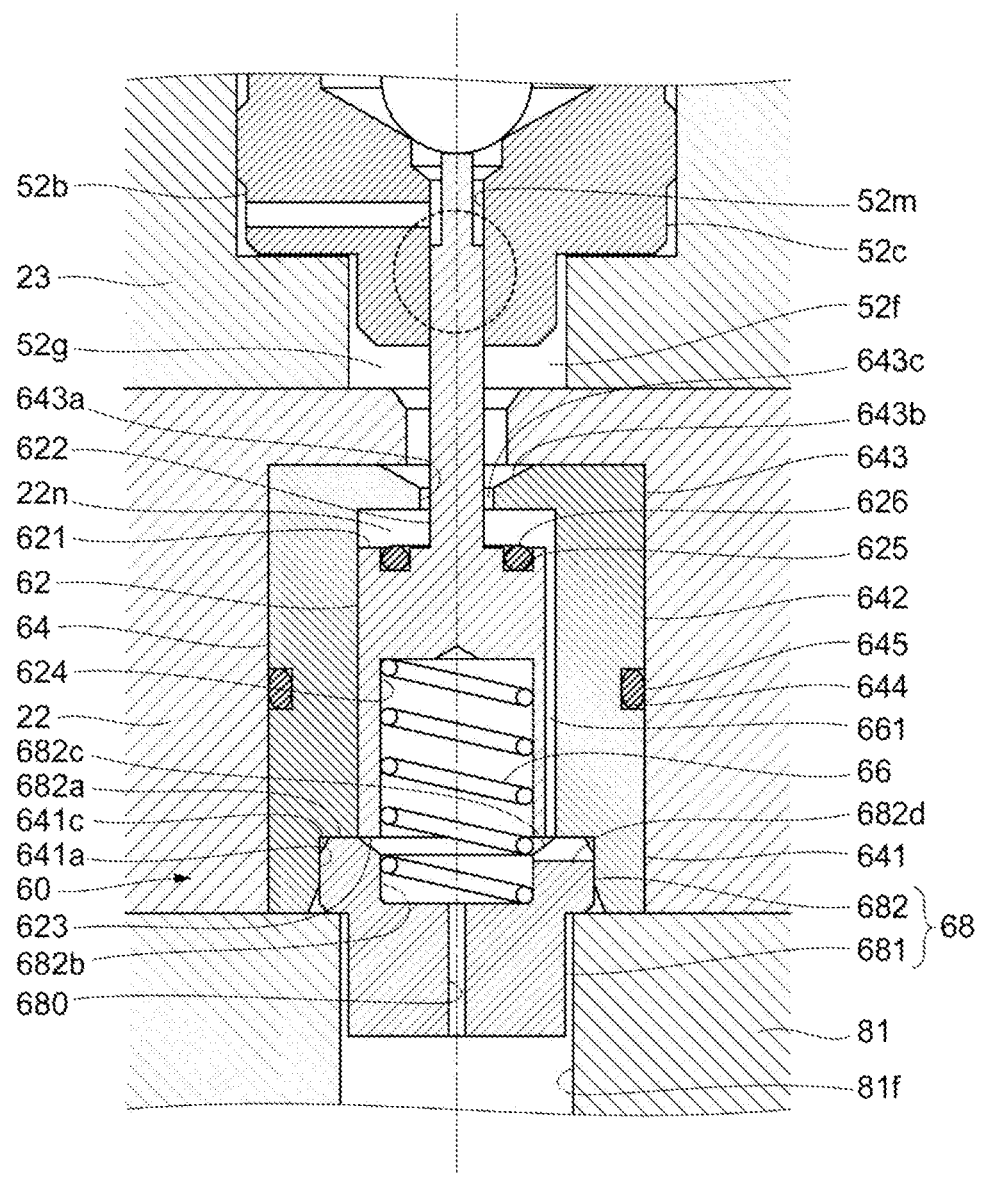
FIG. 6 is an enlarged view of a portion VI of FIG. 5, which view shows details of an example of a second non-return valve 60.

FIG. 6 is an enlarged view of a portion VI of FIG. 5, which view shows details of an example of a second non-return valve 60.

Figure 7:
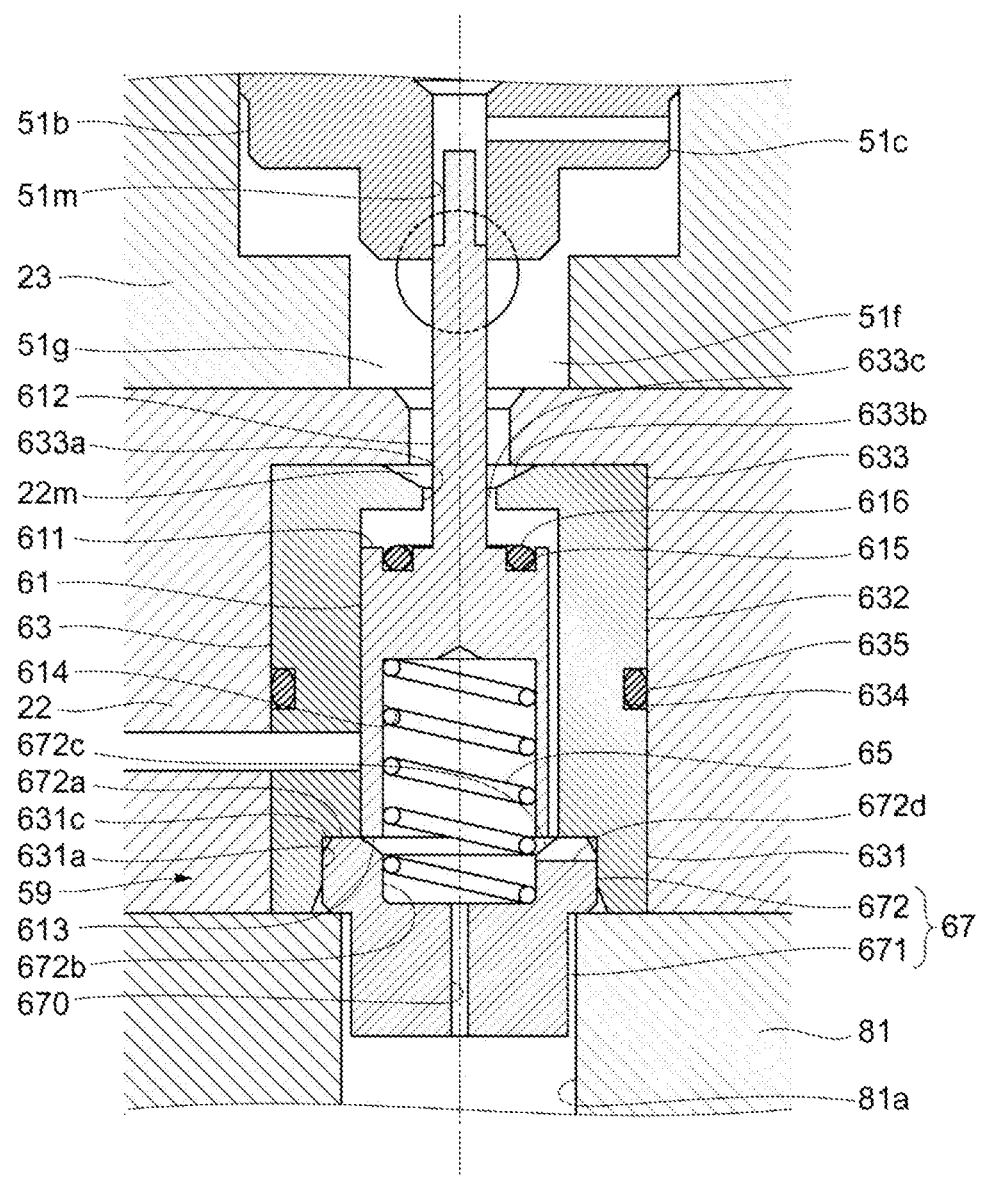
FIG. 7 is an enlarged view of a portion VII of FIG. 5, which view shows details of an example of a first non-return valve 59.

FIG. 7 is an enlarged view of a portion VII of FIG. 5, which view shows details of an example of a first non-return valve 59.

The oil-hydraulic circuit shown in FIG. 3 is a circuit which controls oil to be supplied/discharged to/from the first chamber Y1 and the second chamber Y2.

A first chamber-side flow channel 71 communicating with the first chamber Y1 and a second chamber-side flow channel 72 communicating with the second chamber Y2 are formed between a gear pump 21 and the cylinder device 10. The gear pump 21 is constituted by a pair of gears, and driven by the motor 40 to discharge oil. A changeover valve 51 is disposed on the flow channel 71 and the flow channel 72 so as to lie astride the flow channel 71 and the flow channel 72.

(Changeover Valve 51)

The changeover valve 51 changes over a flow direction of oil into the first chamber Y1 or the second chamber Y2. The changeover valve 51 is provided with a first open valve 51a provided on the flow channel 71, and a second open valve 52a provided on the flow channel 72.

The first open valve 51a is provided with a first activation valve 51b and the first non-return valve 59. The first activation valve 51b is provided with a spool 51c and an activation valve ball 51d. The spool 51c slides inside a first valve chamber 51f. The activation valve ball 51d is built in the spool 51c. The first valve chamber 51f is partitioned into a main oil chamber 51g and a sub oil chamber 51h by the spool 51c. The main oil chamber 51g is located on a side communicating with the first non-return valve 59. The sub oil chamber 51h is located on an opposite side to the main oil chamber 51g. Of the flow channel 71, a flow channel 71B starting at the gear pump 21 and communicating with the first open valve 51a is connected to the main oil chamber 51g of the first open valve 51a.

A through hole 51m is formed in the spool 51c to penetrate the spool 51c in a direction of a center line, and a protrusion 612 of a movable member 61 which will be described later is inserted into the through hole 51m. In addition, a first hole 51j and a second hole 51k are formed in the spool 51c. The main oil chamber 51g and the sub oil chamber 51h are arranged to communicate with each other through the first hole 51j. The sub oil chamber 51h and a communication channel 51R which will be described later are arranged to communicate with each other through the second hole 51k.

When pressure in the main oil chamber 51g is higher than pressure in the sub oil chamber 51h, the activation valve ball 51d opens the first hole 51j. On the other hand, when the pressure in the main oil chamber 51g is lower than the pressure in the sub oil chamber 51h, the activation valve ball 51d closes the first hole 51j.

The second open valve 52a also has a configuration similar to or the same as that of the first open valve 51a. That is, the second open valve 52a is provided with a second activation valve 52b and the second non-return valve 60. The second activation valve 52b is provided with a spool 52c and an activation valve ball 52d. The spool 52c slides inside a second valve chamber 52f. The activation valve ball 52d is built in the spool 52c. The second valve chamber 52f is partitioned into a main oil chamber 52g and a sub oil chamber 52h by the spool 51c. The main oil chamber 52g is located on a side communicating with the second non-return valve 60. The sub oil chamber 52h is located on an opposite side to the main oil chamber 52g. Of the flow channel 72, a flow channel 72B starting at the gear pump 21 and communicating with the second open valve 52a is connected to the main oil chamber 52g of the second open valve 52a. A through hole 52m is formed in the spool 52c to penetrate the spool 52c in a direction of a center line, and a protrusion 622 of a movable member 62 which will be described later is inserted into the through hole 52m. In addition, a first hole 52j and a second hole 52k are formed in the spool 52c. The activation valve ball 52d is built in the spool 52c to open/close the first hole 52j in accordance with a magnitude relation between pressure in the main oil chamber 52g and pressure in the sub oil chamber 52h.

The sub oil chamber 51h of the first open valve 51a and the sub oil chamber 52h of the second open valve 52a communicate with each other through the communication channel 51R.

Here, for example, oil sent out from the gear pump 21 to the flow channel 71B due to normal rotation of the gear pump 21 flows into the main oil chamber 51g. Pressure in the main oil chamber 51g becomes so high that the first non-return valve 59 is open. As a result, the oil flows into the flow channel 71A of the flow channel 71, and then flows into the first chamber Y1. The flow channel 71A starts at the first open valve 51a and communicates with the first chamber Y1 of the cylinder device 10. The oil flowing into the first chamber Y1 presses the piston 12 toward the second chamber Y2.

In addition, the oil flowing into the main oil chamber 51g pushes up the activation valve ball 51d inside the spool 51c of the first activation valve 51b to open the first activation valve 51b and flow into the sub oil chamber 51h. The oil flowing into the sub oil chamber 51h passes through the communication channel 51R and then arrives at the sub oil chamber 52h of the second open valve 52a. Since the second activation valve 52b is shut by the activation valve ball 52d, oil in the sub oil chamber 52h is prevented from flowing into the main oil chamber 52g. When pressure in the sub oil chamber 52h reaches a predetermined value due to the arrival of the oil, the spool 52c is pressed to move toward the main oil chamber 52g.

Due to the second activation valve 52b moving toward the main oil chamber 52g, the second non-return valve 60 is pressed to be open. As a result, of the flow channel 72, the flow channel 72A communicating with the second chamber Y2 of the cylinder device 10 and the flow channel 72B communicate with each other through the second open valve 52a. Thus, oil in the second chamber Y2 on the side pressed by the piston 12 is discharged to the flow channel 72, and returned to the gear pump 21 through the flow channel 72.

On the other hand, a flow of oil sent out from the gear pump 21 to the flow channel 72B due to reverse rotation of the gear pump 21 is also similar to or the same as the case of the normal rotation of the gear pump 21. That is, oil flows into the main oil chamber 52g to open the second non-return valve 60. Accordingly, the oil flows into the flow channel 72A to flow into the second chamber Y2 of the cylinder device 10. The oil flowing into the second chamber Y2 presses the piston 12 toward the first chamber Y1.

In addition, the oil flowing into the main oil chamber 52g pushes up the activation valve ball 52d inside the spool 52c to flow into the sub oil chamber 52h and arrive at the sub oil chamber 51h of the first open valve Ma through the communication channel 51R. The oil arriving at the sub oil chamber 51h presses the spool Mc toward the main oil chamber 51g. The pressed spool 51c presses and opens the first non-return valve 59. As a result, the flow channel 71A and the flow channel 71B communicate with each other. Thus, the oil in the first chamber Y1 on the side pressed by the piston 12 is discharged to the flow channel 71 and returned to the gear pump 21 through the flow channel 71.

Thus, the first activation valve 51b and the second activation valve 52b has a function of being displaced upon reception of pressure of the oil from the gear pump 21 to open the second non-return valve 60 or the first non-return valve 59 in the displacement direction in accordance with the displacement.

The first non-return valve 59 and the second non-return valve 60 has a function of being opened by pressure acting on the first valve chamber 51f or the second valve chamber 52f so as to supply the oil to the cylinder device 10, and a function of being opened by the displacement of the second activation valve 52b or the first activation valve 51b to thereby return the oil from the cylinder device 10.

(Specific Structure of Hydraulic Cylinder Device 2)

As shown in FIG. 4 and FIG. 5, the hydraulic cylinder device 2 is provided with a pump case 25, an upblow valve 53, a downblow valve 54, a third relief valve 55, and two check valves 57 and 58. The pump case 25 is formed into a so-called three-body structure including a first case 22, a second case 23, and a cover plate 24, which are superimposed in the named order and integrated by five fastening members 28a, 28b, 28c, 28d and 28e. Incidentally, some of the five fastening members 28a, 28b, 28c, 28d and 28e also perform a function of fixing the hydraulic cylinder device 2 to the housing 81.

The hydraulic cylinder device 2 is configured integrally in such a manner that the gear pump 21, the changeover valve 51, the upblow valve 53, the downblow valve 54, the third relief valve 55, and the two check valves 57 and 58 are received in the pump case 25.

A groove 22b is formed in, of the first case 22, a bottom face which is a face on the side of the housing 81. In addition, a pump chamber 22a where the gear pump 21 is received, check valve chambers 22g and 22h where the check valves 57 and 58 are received, and a first non-return valve chamber 22m and a second non-return valve chamber 22n where the first non-return valve 59 and the second non-return valve 60 are received are formed in the first case 22.

The first non-return valve chamber 22m and the second non-return valve chamber 22n are formed to respectively penetrate the first case 22 and the second case 23 in a superimposition direction (an up/down direction of FIG. 4) of the first case 22 and the second case 23.

The first valve chamber 51f and the second valve chamber 52f are formed in the second case 23. The first valve chamber 51f and the second valve chamber 52f are also formed respectively to penetrate the second case 23 in a thickness direction thereof (the superimposition direction of the first case 22 and the second case 23). In addition, an upblow valve chamber 23a, a downblow valve chamber 23b, and a third relief valve chamber 23c are formed in the second case 23.

The cover plate 24 closes openings of the first valve chamber 51f and the second valve chamber 52f formed in the second case 23.

The upblow valve 53 is provided with a valve ball 53d, a push pin 53c, an adjustment screw 53a, and a coil spring 53b. An upper portion of the adjustment screw 53a where a tool groove 53e is formed protrudes upward from the second case 23.

In a manner similar to or the same as the upblow valve 53, the downblow valve 54 is also provided with a valve ball 54d, a push pin 54c, an adjustment spring 54a, and a coil spring 54b. An upper portion of the adjustment spring 54a where a tool groove 54e is formed protrudes upward from the second case 23.

The third relief valve 55 is disposed to lie astride the first case 22 and the second case 23. In a manner similar to or the same as the upblow valve 53 and the downblow valve 54, the third relief valve 55 is also provided with a valve ball 55d, a push pin 55c, an adjustment screw 55a, and a coil spring 55b. The valve ball 55d opens/closes a gap between the flow channel 71A and a third open flow channel 75. An upper portion of the adjustment screw 55a where a screw groove 55e is formed protrudes upward from the second case 23.

The check valves 57 and 58 are disposed respectively in the check valve chambers 22g and 22h formed in the first case 22.

As shown in FIG. 5, of the first open valve 51a and the second open valve 52a of the changeover valve 51, the first activation valve 51b and the second activation valve 52b are disposed in the first valve chamber 51f and the second valve chamber 52f which are formed in the second case 23.

In the state in which the first activation valve 51b is disposed in the first valve chamber 51f, and the second activation valve 52b is disposed in the second valve chamber 52f, the cover plate 24 is superimposed on the second case 23 and fixed thereto. Thus, upper faces of the first valve chamber 51f and the second valve chamber 52f are covered with the cover plate 24. On this occasion, O-rings 24a and 24b are mounted between the first valve chamber 51f and the cover plate 24 and between the second valve chamber 52f and the cover plate 24 respectively. Accordingly, liquidtightness of the first valve chamber 51f and the second valve chamber 52f can be secured.

The first valve chamber 51f and the second valve chamber 52f are formed respectively to penetrate the second case 23 in the thickness direction thereof. Accordingly, both the first activation valve 51b and the second activation valve 52b received in the first valve chamber 51f and the second valve chamber 52f respectively can slide along the superimposition direction of the first case 22 and the second case 23.

Incidentally, the communication channel 51R described in the oil-hydraulic circuit is formed in the second case 23 so that the sub oil chamber 51h of the first valve chamber 51f and the sub oil chamber 52f of the second valve chamber 52 are connected to each other through the communication channel 51R.

The first non-return valve chamber 22m formed in the first case 22 is formed in a portion opposed to the first valve chamber 51f in a state in which the first case 22 and the second case 23 are superimposed on each other. In addition, the second non-return valve chamber 22n formed in the first case 22 is formed in a portion opposed to the second valve chamber 52f in the state in which the first case 22 and the second case 23 are superimposed on each other.

(Second Non-Return Valve 60)

As shown in FIG. 6, the second non-return valve 60 of the hydraulic cylinder device 2 has the movable member 62 and a case 64. The movable member 62 can move in the superimposition direction of the first case 22 and the second case 23. The case 64 receives the movable member 62. In addition, the second non-return valve 60 has a coil spring 66 serving as an example of an elastic member, and a support member 68. The coil spring 66 can apply elastic force on the movable member 62. The support member 68 supports an end portion on the housing 81 side in the coil spring 66.

The movable member 62 is a columnar member. The movable member 62 has the protrusion 622 which is shaped like a circular column protruding toward the main oil chamber 52g from an end face 621 on the second main oil chamber 52g side of the second valve chamber 52. In addition, a recess 624 is formed in the movable member 62 to sink in the shape of a circular column from an end face 623 on the housing 81 side toward the main oil chamber 52g. In addition, a groove 625 is formed in the movable member 62 and around the protrusion 622 to sink in the shape of a ring from the end face 621 toward the housing 81. An O-ring 626 is fitted into the groove 625. Incidentally, the direction of the center line in the columnar movable member 62 may be hereinafter referred to as "center line direction".

An internal diameter of the recess 624 is larger than an external diameter of the coil spring 66.

The case 64 has a first portion 641, a second portion 642, and a third portion 643 which are three circularly tubular parts which are equal in external diameter but different in internal diameter. The first portion 641, the second portion 642 and the third portion 643 are provided sequentially from the housing 81 toward the main oil chamber 52g in the center line direction. A groove 644 is formed in an outer circumferential face of the second portion 642 to extend along the whole circumference thereof. An O-ring 645 is fitted into the groove 644.

The internal diameter of the first portion 641 is larger than the internal diameter of the second portion 642. The internal diameter of the second portion 642 is larger than the internal diameter of the third portion 643.

The internal diameter of the second portion 642 is large enough to receive the movable member 62 inside the second portion 642.

An internal diameter of a smallest internal diameter part of the third portion 643 is larger than an external diameter of the protrusion 622. The protrusion 622 is inserted into the aforementioned smallest internal diameter part of the third portion 643. A chamfer 643b is formed in an end portion on the main oil chamber 52g side in an inner circumferential face 643a of the aforementioned smallest internal diameter part.

The interior of the case 64 forms a flow channel from the main oil chamber 52g toward the exterior of the main oil chamber 52g. The inner circumferential face 643a of the third portion 643 forms an opening portion 643c on the main oil chamber 52g side. An inner circumferential face 641a of the first portion 641 forms an opening portion 641c on the exterior side.

The coil spring 66 is disposed inside the recess 624 to be smaller than a diameter of an inner circumferential face of the recess 624 in a state of a free length. The end portion on the housing 81 side in the coil spring 66 is supported by the support member 68. An end portion on the main oil chamber 52g side in the coil spring 66 is supported by the movable member 62. The coil spring 66 applies force on the movable member 62 in a direction to move the movable member 62 toward the main oil chamber 52g.

The support member 68 is a member having two parts different in external diameter, i.e. a first portion 681 and a second portion 682. The first portion 681 is provided on the housing 81 side. The second portion 682 is provided on the main oil chamber 52g side.

An external diameter of the first portion 681 is smaller than an external diameter of the second portion 682. In addition, the external diameter of the first portion 681 is smaller than a hole size of the fourth hole 81f formed in the housing 81. The hydraulic cylinder device 2 is mounted into the housing 81 in a state in which the first portion 681 has been inserted in the fourth hole 81f.

The external diameter of the second portion 682 is larger than the internal diameter of the first portion 641 of the case 64. The support member 68 is pressed into the first portion 641. A height of the second portion 682 in the center line direction is not larger than a height of the first portion 641 in the center line direction. Force in the center line direction generated in the support member 68 due to contact pressure between an outer circumferential face of the second portion 682 and the inner circumferential face of the first portion 641 is set to be larger than spring force of the coil spring 66 acting on the support member 68 in a state in which the hydraulic cylinder device 2 has not been mounted into the housing 81 yet. Accordingly, the support member 68 can be suppressed from falling off the case 64 before the hydraulic cylinder device 2 is mounted into the housing 81.

In addition, the external diameter of the second portion 682 is larger than the hole size of the fourth hole 81f formed in the housing 81. The second portion 682 is interposed between the housing 81 and the second portion 642 of the case 64. Thus, after the hydraulic cylinder device 2 has been mounted into the housing 81, an end face on the housing 81 side in the second portion 682 makes contact with the housing 81. Accordingly, the support member 68 can be suppressed from falling off the case 64.

In addition, a recess 682b is formed in, of the second portion 682, a radial-direction center portion intersecting the center line direction so that the recess 682b sinks from an end face 682a on the main oil chamber 52g side toward the housing 81. The shape of the recess 682b is shaped like a circular column. The diameter of an inner circumferential face of the recess 682b is larger than the external diameter of the coil spring 66. An end portion of the coil spring 66 is disposed inside the recess 682b. A chamfer 682c is formed in an edge on the second portion 642 side in the recess 682b. The chamfer 682c is formed so that a distance between the chamfer 682c and the center line of the coil spring 66 decreases gradually from the end face 682a of the second portion 682 toward the housing 81. Due to the chamfer 682c formed thus, the coil spring 66 can be suppressed from making contact with the end face 682a of the second portion 682.

In addition, a plurality of (e.g. four) grooves 682d are formed at equal intervals circumferentially and in the second portion 682 to sink from the end face 682a toward the housing 81.

In addition, a through hole 680 is formed in, of the support member 68, the radial-direction center portion intersecting the center line direction so that the through hole 680 penetrates the first portion 681 and the second portion 682 in the center line direction. The through hole 680 is a circularly columnar hole which is uniform in internal diameter. The through hole 680 makes communication between the interior of the recess 682b and the exterior of the support member 68 on the first portion 681 side, i.e. the fourth hole 81f formed in the housing 81.

The second non-return valve 60 having the aforementioned configuration is closed when force acting on the face on the housing 81 side in the movable member 62 is higher than force acting on the face on the main oil chamber 52g in the movable member 62. In this case, the O-ring 626 fitted into the movable member 62 is brought into contact with the end face on the movable member 62 side in the third portion 643 of the case 64.

On the other hand, the second non-return valve 60 is open when the force acting on the face on the main oil chamber 52g side is larger than the force acting on the face on the housing 81 side and when the protrusion 622 of the movable member 62 has been pressed by the activation valve ball 52d of the second activation valve 52b. In any of these cases, the movable member 62 moves toward the housing 81 against the spring force of the coil spring 66, and the O-ring 626 fitted into the movable member 62 leaves the end face on the movable member 62 side in the third portion 643 of the case 64.

When the second non-return valve 60 is open, oil in the main oil chamber 52g flows into the flow channel 72A through a flow channel formed by a gap between the inner circumferential face 643a of the third portion 643 and the protrusion 622 of the movable member 62, a flow channel 661 formed by a gap between an inner circumferential face of the second portion 642 and an outer face of the movable member 62, flow channels formed by the grooves 682d of the support member 68, a flow channel formed by the through hole 680 of the support member 68, etc.

In the second non-return valve 60 according to the present embodiment, a sectional area of the flow channel in the through hole 680 of the support member 68 is set to be smaller than a flow channel sectional area of the flow channel 72B, or a flow channel sectional area in the flow channel between the main oil chamber 52g and the through hole 680 of the support member 68. Therefore, the through hole 680 of the support member 68 functions as a throttle in the flow channel 72.

(First Non-Return Valve 59)

The first non-return valve 59 has the same configuration as the second non-return valve 60. Accordingly, detailed description about the first non-return valve 59 will be omitted. In the following description, the same names will be used for constituent components of the first non-return valve 59 having the same shapes and functions as constituent components of the second non-return valve 60 but different signs will assigned to the constituent components of the first non-return valve 59 in order to distinguish the constituent components of the first non-return valve 59 from the constituent components of the second non-return valve 60.

The first non-return valve 59 has the movable member 61, a case 63, a coil spring 65 and a support member 67.

The movable member 61 has the protrusion 612 protruding toward the main oil chamber 51g from an end face 611 on the main oil chamber 51g side of the first valve chamber 51f. In addition, a recess 614 is formed in the movable member 61 to sink from an end face 613 on the housing 81 side toward the main oil chamber 51g. In addition, a groove 615 is formed in the movable member 61 to surround the protrusion 612. An O-ring 616 is fitted into the groove 615.

An internal diameter of the recess 614 is larger than an external diameter of the coil spring 65 in a state of a free length.

The case 63 has a first portion 631, a second portion 632 and a third portion 633. A groove 634 is formed in an outer circumferential face of the second portion 632 to extend along the whole circumference thereof. An O-ring 635 is fitted into the groove 634.

An internal diameter of a smallest internal diameter part of the third portion 633 is larger than an external diameter of the protrusion 612. The protrusion 612 is inserted into the aforementioned smallest internal diameter part of the third portion 633. A chamfer 633b is formed in an end portion on the main oil chamber 51g side in an inner circumferential face 633a of the aforementioned smallest internal diameter part.

The interior of the case 63 forms a flow channel from the main oil chamber 51g toward the exterior of the main oil chamber 51g. The inner circumferential face 633a of the third portion 633 forms an opening portion 633c on the main oil chamber 51g side. An inner circumferential face 631a of the first portion 631 forms an opening portion 631c on the exterior side.

The support member 67 has a first portion 671 and a second portion 672, which are different in external diameter.

The external diameter of the first portion 671 is smaller than a hole size of the first hole 81a of the housing 81. The hydraulic cylinder device 2 is mounted into the housing 81 in a state in which the first portion 671 has been inserted in the first hole 81a.

A recess 672b is formed in, of the second portion 672, a radial-direction center portion intersecting the center line direction to sink from an end face 672a on the main oil chamber 51g side toward the housing 81. A chamfer 672c is formed in an edge on the second portion 632 side in the recess 672b.

In addition, a plurality of (e.g. four) grooves 672d are formed at regular intervals circumferentially and in the second portion 672 to sink from the end face 672a toward the housing 81.

In addition, a through hole 670 is formed in, of the support member 67, the radial-direction center portion intersecting the center line direction so that the through hole 670 penetrates the first portion 671 and the second portion 672 in the center line direction. The through hole 670 is a circularly columnar hole whose internal diameter is uniform. The through hole 670 makes communication between the interior of the recess 672b and the exterior of the support member 67 on the first portion 671 side, i.e. the first hole 81a formed in the housing 81.

The first non-return valve 59 having the aforementioned configuration is closed when force acting on a face on the housing 81 side in the movable member 61 is higher than force acting on a face on the main oil chamber 51g in the movable member 61. In this case, the O-ring 616 fitted into the movable member 61 is brought into contact with an end face on the movable member 61 side in the third portion 633 of the case 63.

On the other hand, the first non-return valve 59 is open when the force acting on the face on the main oil chamber 51g side is larger than the force acting on the face on the housing 81 side and when the protrusion 612 of the movable member 61 has been pressed by the activation valve ball 51d of the first activation valve 51b. In any of these cases, the movable member 61 moves toward the housing 81 against spring force of the coil spring 65, and the O-ring 616 fitted into the movable member 61 leaves the end face on the movable member 61 side in the third portion 633 of the case 63.

When the first non-return valve 59 is open, oil in the main oil chamber 51g flows into the flow channel 71A through a flow channel formed by a gap between the inner circumferential face 633a of the third portion 633 and the protrusion 612 of the movable member 61, a flow channel formed by a gap between an inner circumferential face of the second portion 632 and an outer face of the movable member 61, flow channels formed by the grooves 672d of the support member 67, a flow channel formed by the through hole 670 of the support member 67, etc.

In the first non-return valve 59 according to the present embodiment, a sectional area of the flow channel in the through hole 670 of the support member 67 is set to be smaller than a flow channel sectional area of the flow channel 71B, or a flow channel sectional area in the flow channel between the main oil chamber 51g and the through hole 670 of the support member 67. Therefore, the through hole 670 of the support member 67 functions as a throttle in the flow channel 71.

<Effect of Hydraulic Cylinder Device 2>

In the hydraulic cylinder device 2 having the aforementioned configuration, when the gear pump 21 is rotated in a reverse direction, oil sent out from the gear pump 21 to the flow channel 72B flows into the main oil chamber 52g of the second open valve 52a. Due to pressure in the main oil chamber 52g becoming higher thus, the second non-return valve 60 is open. Thus, the oil sent out to the flow channel 72B flows into the flow channel 72A to flow into the second chamber Y2 of the cylinder device 10 to thereby press the piston 12 toward the first chamber Y1.

In addition, after the oil flowing into the main oil chamber 52g of the second open valve 52a flows into the sub oil chamber 52h, the oil reaches the sub oil chamber 51h of the first open valve 51a through the communication channel 51R. Since the first activation valve 51b is closed by the activation valve ball 51d, the spool 51c is pressed to move toward the main oil chamber 51g when internal pressure of the sub oil chamber 51h reaches a predetermined value or more.

Due to the first activation valve 51b moving toward the main oil chamber 51g, the first non-return valve 59 is open so that the oil in the first chamber Y1 on the side pressed by the piston 12 returns to the gear pump 21 through the flow channel 71.

In the hydraulic cylinder device 2, due to the through hole 680 of the second non-return valve 60 functioning as a throttle in the flow channel 72, pressure in the main oil chamber 52g becomes higher than pressure of the flow channel 72A at a retraction stroke in which the cylinder device 10 retracts. Since pressure in the sub oil chamber 51h communicating with the main oil chamber 52g and the sub oil chamber 52h through the communication channel 51R becomes higher, the spool 51c of the first activation valve 51b is apt to move toward the main oil chamber 51g. The first non-return valve 59 is apt to be open.

In addition, in the hydraulic cylinder device 2, due to the through hole 670 of the first non-return valve 59 functioning as a throttle in the flow channel 71, pressure in the main oil chamber 51g becomes lower than pressure of the flow channel 71A at a retraction stroke in which the cylinder device 10 retracts. Therefore, the spool 51c of the first activation valve 51b is apt to move toward the main oil chamber 51g. The first non-return valve 59 is apt to be open.

In addition, the throttle function in the flow channel 72 is exerted by the through hole 680. The throttle function in the flow channel 71 is exerted by the through hole 670. Accordingly, each of the shapes of the flow channels of the throttled portions is fixed. Therefore, it is difficult to change the way of the oil flow in the throttled portion, in comparison with a configuration in which the shape of a flow channel of each throttled portion is variable. Accordingly, it is possible to obtain a throttle effect stably.

Thus, when the gear pump 21 in the hydraulic cylinder device 2 is rotated in the reverse direction in order to retract the cylinder device 10, the first non-return valve 59 can be made open accurately. As a result, according to the hydraulic cylinder device 2, jerky motion when the cylinder device 10 is retracted can be suppressed accurately, in comparison with the configuration where the shape of the flow channel of the throttled portion is variable.

In addition, in the hydraulic cylinder device 2, the aforementioned effect is obtained by use of the support members 67 and 68 supporting the end portions of the coil springs 65 and 66. Accordingly, the number of components does not increase. That is, the hydraulic cylinder device 2 can stabilize the throttle effect without increasing the number of components.

In addition, the hydraulic cylinder device 2 is fixed to the housing 81 in the state in which the first portion 671 of the support member 67 is inserted into the first hole 81*a* formed in the housing 81, and the first portion 681 of the support member 68 is inserted into the fourth hole 81*f* formed in the housing 81. Therefore, the hydraulic cylinder device 2 can be suppressed from being displaced from the housing 81.

Incidentally, in the aforementioned hydraulic cylinder device 2, the first non-return valve 59 has the same configuration as that of the second non-return valve 60. However, the first non-return valve 59 may have a different configuration from that of the second non-return valve 60. For example, the first non-return valve 59 may have the same configuration as the first non-return valve 51*e* described in PTL 1.

Second Embodiment

Figure 8:
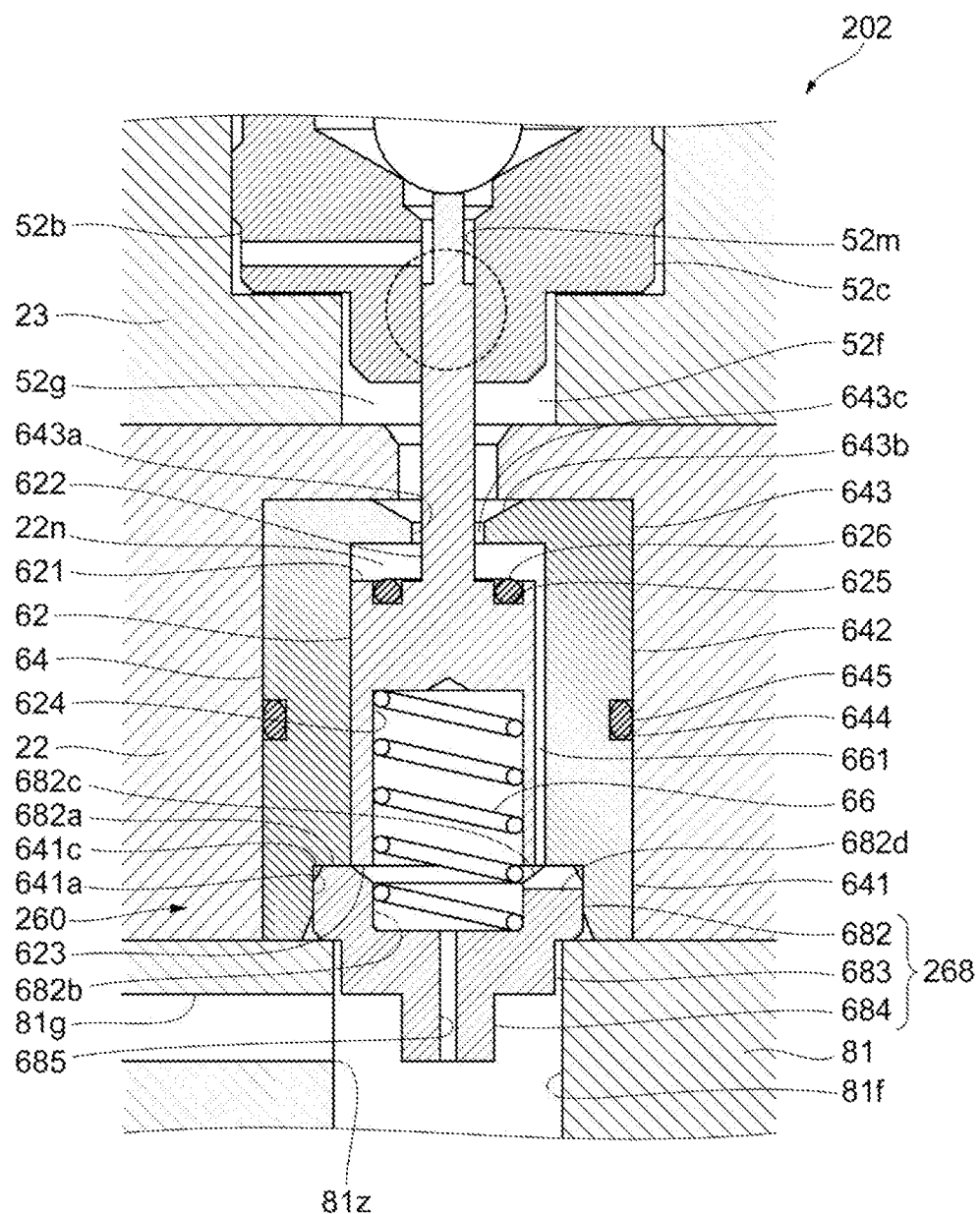
FIG. 8 is a view showing a schematic configuration of a hydraulic cylinder device 202 according to a second embodiment.

FIG. 8 is a view showing a schematic configuration of a hydraulic cylinder device 202 according to a second embodiment.

The hydraulic cylinder device 202 is different from the aforementioned hydraulic cylinder device 2 in a second non-return valve 260 corresponding to the second non-return valve 60. The second non-return valve 260 is different from the second non-return valve 60 in a support member 268 corresponding to the support member 68. The different points between the hydraulic cylinder device 202 and the hydraulic cylinder device 2 will be described below. Constituent members having the same functions between the hydraulic cylinder device 2 and the hydraulic cylinder device 202 will be referred to by the same signs respectively and correspondingly, and detailed description thereof will be omitted.

The support member 268 has a third portion 683 and a fourth portion 684. The third portion 683 is provided on the side of a housing 81 with respect to a second portion 682. The fourth portion 684 is provided on the side of the housing 81 with respect to the third portion 683.

An external diameter of the third portion 683 is smaller than an external diameter of the second portion 682. An external diameter of the fourth portion 684 is smaller than the external diameter of the third portion 683. In addition, the external diameter of the third portion 683 is the same as the external diameter of the first portion 681 of the support member 68 according to the first embodiment. The third portion 683 and the fourth portion 684 are inserted into a fourth hole 81*f* formed in the housing 81, in a manner similar to or the same as the first portion 681 of the support member 68 according to the first embodiment.

A through hole 685 is formed in, of the support member 268, in a radial-direction center portion intersecting a center line direction so that the through hole 685 penetrates the second portion 682, the third portion 683 and the fourth portion 684 in the center line direction. The through hole 685 makes communication between the interior of a recess 682*b* of the second portion 682 and the exterior of the support member 268 on the fourth portion 684 side.

In addition, a center-line-direction thickness of the support member 268 which is obtained by adding center-line-direction thicknesses of the second portion 682, the third portion 683 and the fourth portion 684 is equal to a center-line-direction thickness of the support member 68 which is obtained by adding center-line-direction thicknesses of the first portion 681 of the support member 68 according to the first embodiment and the second portion 682 of the support member 68. In other words, a center-line-direction length of the through hole 685 of the support member 268 and a center-line-direction length of the through hole 680 of the support member 68 are equal to each other. Accordingly, the support member 268 can exert an equivalent throttle effect to that of the support member 68 according to the first embodiment.

In the hydraulic cylinder device 202 having the aforementioned configuration, a gap between an outer circumferential face of the fourth portion 684 of the support member 268 and an inner circumferential face of the fourth hole 81*f* is larger than a gap between an outer circumferential face of the first portion 681 of the aforementioned support member 68 and an inner circumferential face of the fourth hole 81*f*. Accordingly, when, for example, a connection part 81*z* between a fifth hole 81*g* and the fourth hole 81*f* overlaps a position where the fourth portion 684 of the support member 268 is present in the center line direction, oil coming out of the through hole 685 of the support member 268 is apt to enter the fifth hole 81*g*. The fifth hole 81*g* serves as a portion of a flow channel 72A formed in the housing 81. As a result, when a gear pump 21 rotates in a reverse direction in order to make oil flow into a second chamber Y2 of a cylinder device 10, the oil coming out of the through hole 685 of the support member 268 is apt to enter the second chamber Y2 smoothly.

Incidentally, the fourth portion 684 is provided in the support member 268 in order to increase the gap between the part of the support member 268 inserted into the fourth hole 81*f* and the inner circumferential face of the fourth hole 81*f*. However, the support member 268 does not have to be limited to such a form particularly. The support member 268 may have any shape as long as, in the part of the support member 268 inserted into the fourth hole 81*f*, the size in a direction perpendicular to a hole direction of the through hole 685 is smaller on the exterior side of the support member 268 than on the main oil chamber 52*g* side. For example, the support member 268 may be formed into a conical shape whose outer diameter is gradually smaller from an end face on the housing 81 side in the second portion 682 toward the exterior of the support member 268.

Incidentally, the support member 67 of the first non-return valve 59 may have a configuration similar to or the same as the support member 268 of the second non-return valve 260.

Third Embodiment

Figure 9:
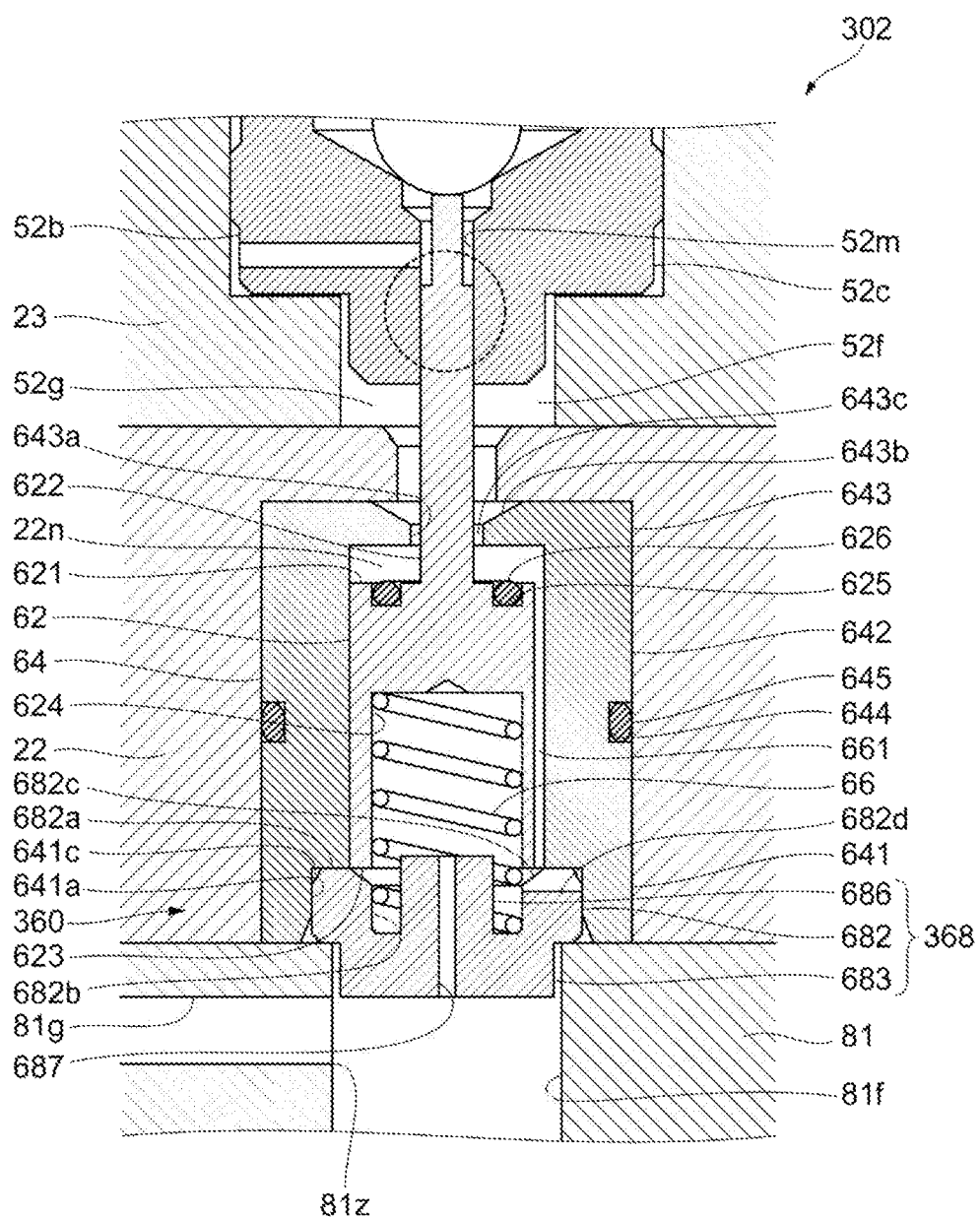
FIG. 9 is a view showing a schematic configuration of a hydraulic cylinder device 302 according to a third embodiment.

FIG. 9 is a view showing a schematic configuration of a hydraulic cylinder device 302 according to a third embodiment.

The hydraulic cylinder device 302 is different from the aforementioned hydraulic cylinder device 202 in a second non-return valve 360 corresponding to the second non-return valve 260. The second non-return valve 360 is different from the second non-return valve 260 in a support member 368 corresponding to the support member 268. The different points between the hydraulic cylinder device 302 and the hydraulic cylinder device 202 will be described below. Constituent members having the same functions between the hydraulic cylinder device 202 and the hydraulic cylinder device 302 will be referred to by the same signs respectively and correspondingly, and detailed description thereof will be omitted.

The support member 368 has a second portion 682 and a third portion 683. On the other hand, the support member 368 does not have the fourth portion 684 of the support member 268. The third portion 683 is inserted into a fourth hole 81f formed in a housing 81.

The second portion 682 has a projection 686 projecting from a bottom face of a recess 682b toward a main oil chamber 52g. An external diameter of the projection 686 is smaller than an internal diameter of a coil spring 66. The projection 686 is disposed on an inner side of the coil spring 66.

A through hole 687 is formed in, of the support member 368, a radial-direction center portion intersecting a center line direction so that the through hole 687 penetrates the second portion 682 and the third portion 683 in the center line direction. The through hole 687 makes communication between the interior of a recess 624 of a movable member 62 and the exterior of the support member 368 on the third portion 683 side.

In addition, a center-line-direction height of the projection 686 and the center-line-direction thickness of the fourth portion 684 of the support member 268 are equal to each other. Accordingly, a center-line-direction length of the through hole 687 of the support member 368 and the center-line-direction length of the through hole 685 of the support member 268 are equal to each other.

The support member 368 having the aforementioned configuration has a smaller center-line-direction thickness of a part inserted into the fourth hole 81f than that of the support member 268. That is, the support member 268 has the third portion 683 and the fourth portion 684 inserted into the fourth hole 81f whereas the support member 386 has only the third portion 683 inserted into the fourth hole 81f. Accordingly, even when a center-line-direction position of a connection part 81z between a fifth hole 81g and the fourth hole 81f overlaps the position where the fourth portion 684 of the support member 268 is present, an end portion on the exterior side in the through hole 687 of the support member 368 is positioned on the main oil chamber 52g side with respect to the connection part 81z. The fifth hole 81g serves as a portion of a flow channel 72A. Accordingly, oil coming out of the through hole 687 is apt to enter the fifth hole 81g. As a result, when a gear pump 21 rotates in a reverse direction in order to make oil flow into a second chamber Y2 of a cylinder device 10, the oil coming out of the through hole 687 of the support member 368 is apt to enter the second chamber Y2 smoothly.

In addition, in the hydraulic cylinder device 302, the support member 368 has the projection 686, and the center-line-direction length of the through hole 687 of the support member 368 and the center-line-direction length of the through hole 685 of the support member 268 are equal to each other. Accordingly, the hydraulic cylinder device 302 can exert an equivalent throttle effect to that of the hydraulic cylinder device 202.

In addition, in the hydraulic cylinder device 302, the coil spring 66 is disposed between an outer circumferential face of the projection 686 of the support member 368 and an inner circumferential face of the recess 682b of the support member 368. Accordingly, the coil spring 66 can be suppressed from moving radially.

Incidentally, a support member 67 of a first non-return valve 59 may also have a configuration similar to or the same as the support member 368 of the second non-return valve 360.

Fourth Embodiment

Figure 10:
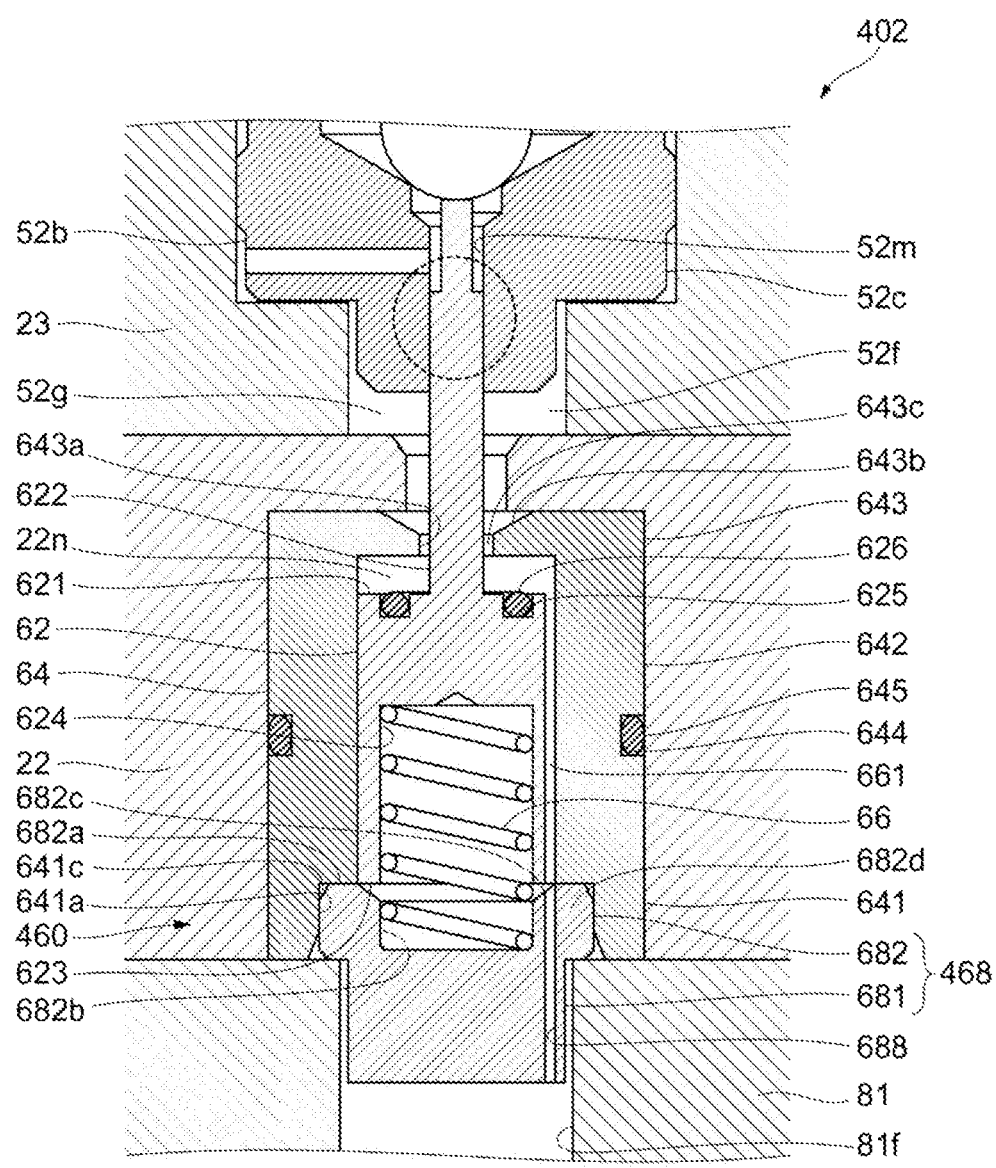
FIG. 10 is a view showing a schematic configuration of a hydraulic cylinder device 402 according to a fourth embodiment.

FIG. 10 is a view showing a schematic configuration of a hydraulic cylinder device 402 according to a fourth embodiment.

The hydraulic cylinder device 402 is different from the aforementioned hydraulic cylinder device 2 in a second non-return valve 460 corresponding to the second non-return valve 60. The second non-return valve 460 is different from the second non-return valve 60 in a support member 468 corresponding to the support member 68. The different points between the hydraulic cylinder device 402 and the hydraulic cylinder device 2 will be described below. Constituent members having the same functions between the hydraulic cylinder device 2 and the hydraulic cylinder device 402 will be referred to by the same signs respectively and correspondingly, and detailed description thereof will be omitted.

A through hole 688 is formed in, of the support member 468, a radially outer side intersecting a center line direction of a recess 682b so that the through hole 688 penetrates a first portion 681 and a second portion 682 in the center line direction. The support member 468 is different from the support member 68 in that neither a through hole nor grooves 682d are formed in a radial-direction center portion of the support member 468.

In the hydraulic oil device 402 having the aforementioned configuration, when the second non-return valve 460 is open, oil in the main oil chamber 52g first passes through a flow channel 661 formed by a gap between an inner circumferential face of a second portion 642 of a case 64 and an outer face of a movable member 62. Then, the oil flows into a flow channel 72A through the through hole 688 of the support member 468. The through hole 688 is formed radially outside a coil spring 66. In such a case, the oil can flow into the flow channel 72A even without passing through a gap between the support member 468 and the movable member 62 or gaps among wires of the coil spring 66. Accordingly, a sectional area of the flow channel is not affected by the position of the movable member 62 or an extended/compressed state of the coil spring 66. Consequently, the hydraulic cylinder device 402 can exert a throttle effect more stably.

Incidentally, an elastic member applying elastic force on the movable member 62 in the second non-return valve 460 may be not the coil spring 66 but another elastic member such as rubber.

In addition, a support member 67 of a first non-return valve 59 may have a configuration similar to or the same as that support member 468 of the second non-return valve 460.

Fifth Embodiment

Figure 11:
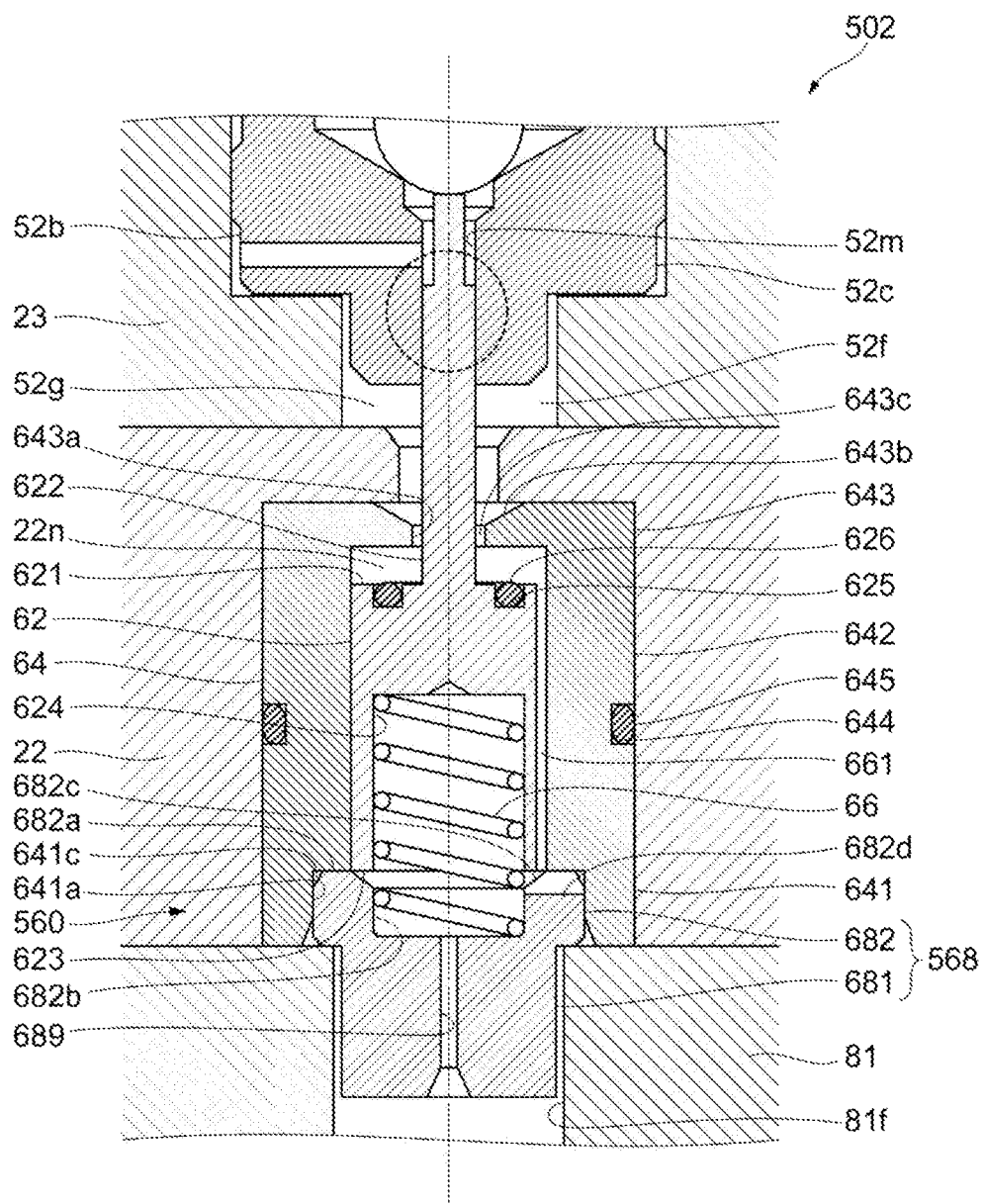
FIG. 11 is a view showing a schematic configuration of a hydraulic cylinder device 502 according to a fifth embodiment.

FIG. 11 is a view showing a schematic configuration of a hydraulic cylinder device 502 according to a fifth embodiment.

The hydraulic cylinder device 502 is different from the aforementioned hydraulic cylinder device 2 in a second non-return valve 560 corresponding to the second non-return valve 60. The second non-return valve 560 is different from the second non-return valve 60 in a support member 568 corresponding to the support member 68. The different points between the hydraulic cylinder device 502 and the hydraulic cylinder device 2 will be described below. Constituent members having the same functions between the hydraulic cylinder device 2 and the hydraulic cylinder device 502 will be referred to by the same signs respectively and correspondingly, and detailed description thereof will be omitted.

A through hole 689 is formed in the support member 568 to penetrate a first portion 681 and a second portion 682 in a center line direction. The through hole 689 is shaped like a circularly columnar hole with a uniform internal diameter on a main oil chamber 52g side but the internal diameter of the through hole 689 in an exterior side end portion of the support member 568 becomes gradually larger from the main oil chamber 52g side toward the exterior.

In the case where a gear pump 21 in the hydraulic cylinder device 502 having the aforementioned configuration is rotated in a normal direction in order to extend a cylinder device 10, oil in a second chamber Y2 on a side pressed by a piston 12 is apt to be introduced into the through hole 689 of the support member 568 on the way to return to the gear pump 21 through a flow channel 72. Thus, when the gear pump 21 is rotated in the normal direction, the oil in the second chamber Y2 is apt to return to the gear pump 21 through the through hole 689 and the main oil chamber 52g. Accordingly, the cylinder device 10 can be extended smoothly.

Incidentally, a diameter and a center-line-direction length of the circularly columnar hole in the through hole 689 are made equal to those of the through hole 680 of the support member 68. Accordingly, the hydraulic cylinder device 502 can exert an equivalent throttle effect to that of the aforementioned hydraulic cylinder device 2.

In addition, the through hole 689 of the support member 568 is formed so that an exterior side end portion of the through hole 689 has an internal diameter which gradually increases from the main oil chamber 52g side toward the exterior. Such a configuration may be applied to the through hole 685 of the aforementioned support member 268, the through hole 687 of the aforementioned support member 368, and the through hole 688 of the aforementioned support member 468.

Sixth Embodiment

Figure 12:
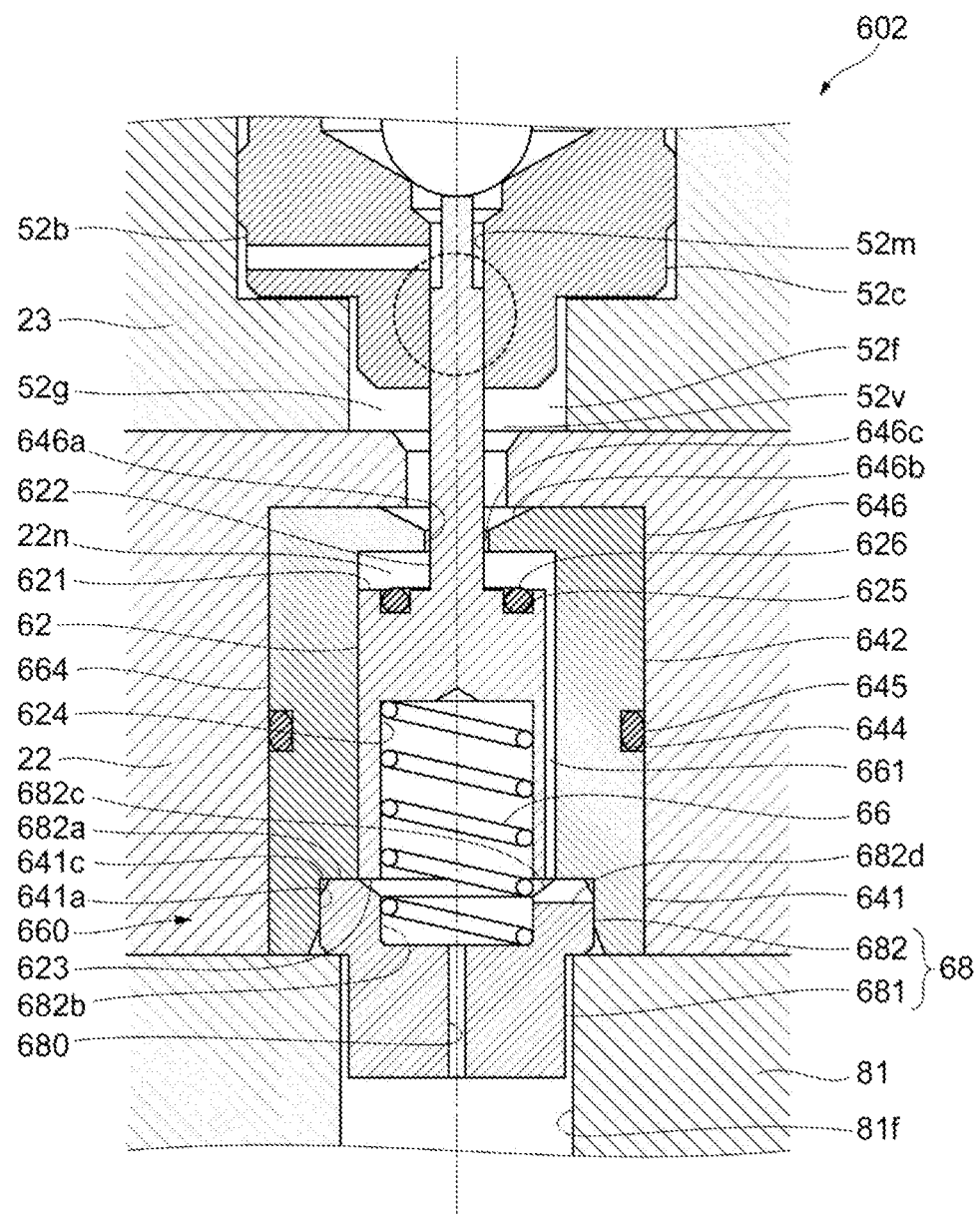
FIG. 12 is a view showing a schematic configuration of a hydraulic cylinder device 602 according to a sixth embodiment.

FIG. 12 is a view showing a schematic configuration of a hydraulic cylinder device 602 according to a sixth embodiment.

The hydraulic cylinder device 602 is different from the aforementioned hydraulic cylinder device 2 in a second non-return valve 660 corresponding to the second non-return valve 60. The second non-return valve 660 is different from the second non-return valve 60 in a case 664 corresponding to the case 64. The different points between the hydraulic cylinder device 602 and the hydraulic cylinder device 2 will be described below. Constituent members having the same functions between the hydraulic cylinder device 2 and the hydraulic cylinder device 602 will be referred to by the same signs respectively and correspondingly, and detailed description thereof will be omitted.

The case 664 is different from the case 64 in a third portion 646 corresponding to the third portion 643 of the case 64. That is, the case 664 has a first portion 641, a second portion 642, and the third portion 646. A chamfer 646b is formed in a main oil chamber 52g side end portion of an inner circumferential face 646a of a smallest internal diameter part of the third portion 646. The inner circumferential face 646a forms an opening portion 646c on the main oil chamber 52g side.

A diameter of the inner circumferential face 646a of the third portion 646 is smaller than a diameter of the aforementioned inner circumferential face 643a. A gap between the third portion 646 of the case 664 and a protrusion 622 of a movable member 62 functions as a throttle in a flow channel between the main oil chamber 52g and a through hole 680 of a support member 68. In addition, the diameter of the inner circumferential face 646a is smaller than a diameter of an inner circumferential face 633a of a case 63 of a first non-return valve 59. However, the diameter of the inner circumferential face 646a is larger than an external diameter of the protrusion 622 of the movable member 622. In addition, a sectional area of the flow channel in the gap between the inner circumferential face 646a and the protrusion 622 of the movable member 62 is set to be larger than a sectional area of a flow channel in the through hole 680 of the support member 68.

In the hydraulic cylinder device 602 having the aforementioned configuration, the sectional area of the flow channel in the gap between the inner circumferential face 646a and the protrusion 622 is smaller than the sectional area of the flow channel in the gap between the inner circumferential face 643a of the third circularly tubular portion 643 according to the first embodiment and the protrusion 622. Therefore, at a retraction stroke where a cylinder device 10 retracts, pressure in the main oil chamber 52g of the hydraulic cylinder device 602 is apt to be higher than that of the hydraulic cylinder device 2. Therefore, according to the hydraulic cylinder device 602, pressure in a sub oil chamber 51h communicating with the main oil chamber 52g and a sub oil chamber 52h through a communication channel 51R is apt to increase. Accordingly, the first non-return valve 59 can be opened accurately. As a result, according to the hydraulic cylinder device 602, jerky motion when the cylinder device 10 is retracted can be suppressed more accurately than that according to the hydraulic cylinder device 2.

Incidentally, in the aforementioned hydraulic cylinder device 602, the inner circumferential face 646a of the third portion 646 is made smaller in diameter than the inner circumferential face 633a of the third portion 633 of the case 63 of the first non-return valve 59. However, the hydraulic cylinder device 602 is not limited to such a mode particularly.

For example, of a second non-return valve chamber 22n, an opening area (an area of a section in which a center line direction is regarded as a normal direction. The same thing will apply to the following description) of an opening portion of a first case 22 opened on a side facing a second case 23 may be made smaller than, of a first non-return valve chamber 22m, an opening area of an opening portion of the first case 22 opened on the side facing the second case 23.

In addition, of the main oil chamber 52g, an opening area of an opening portion of the second case 23 opened on a side facing the first case 22 may be made smaller than, of a main oil chamber 51g, an opening area of an opening portion of the second case 23 opened on the side facing the first case 22.

Even with these shapes, pressure in the main oil chamber 52g is apt to increase at a retraction stroke in which the cylinder device 10 retracts so that pressure in the sub oil chamber 51h communicating with the main oil chamber 52g and the sub oil chamber 52h through the communication channel 51R is apt to increase. Accordingly, the first non-return valve 59 can be open accurately. As a result, jerky motion when the cylinder device 10 retracts can be suppressed accurately.

Incidentally, in each of the aforementioned hydraulic cylinder devices 2, 202, 302, 402, 502 and 602 according to the first to sixth embodiments, the gear pump 21, the changeover valve 51, etc. are received in the pump case 25 and configured integrally. However, the hydraulic cylinder device 2, 202, 302, 402, 502, 602 is not limited to such a mode particularly. For example, the gear pump 21 and the changeover valve 51 may be provided separately from each other. In addition, although the first activation valve 51b and the second activation valve 52b of the changeover valve 51 are provided separately from each other, they may be configured integrally with each other.

In addition, an example in which the aforementioned hydraulic cylinder device 2, 202, 302, 402, 502, 602 is applied to the trim/tilt apparatus 1 is shown in each of the first to sixth embodiments. However, the present invention is not limited to the trim/tilt apparatus 1 but may be applied to another apparatus.

The invention claimed is:

1. A hydraulic cylinder device comprising:
a pump that discharges hydraulic fluid;
a valve body disposed so as to partition an inside of a chamber, into which the hydraulic fluid discharged from the pump flows, into chambers so that when pressure in one chamber of the chambers on one side of the valve body is higher than pressure in another chamber of the chambers on the other side of the valve body, the valve body moves from the one side toward the other side; and
a non-return valve that includes a movable member, an elastic member and a support member, the movable member moving to open and close one opening portion that is an opening portion on the one chamber of the chambers side in a case that forms a flow channel from the one chamber of the chambers toward an exterior of the case, the elastic member giving force to the movable member in a direction to close the one opening portion, the elastic member has one end portion supported by the movable member, the support member being disposed to close a second opening portion on the exterior side to support the other end portion of the elastic member, the support member having a through hole that serves as a throttle for the flow in the flow channel from the one chamber of the chambers toward the exterior, wherein
a sectional area of a flow channel in the through hole is smaller than a sectional area of the one opening portion such that the through hole functions as the throttle, and
the support member has a surface contacting a mounted member on which the hydraulic cylinder device is mounted, and a protruding portion that protrudes toward the exterior side in an axial direction from the surface.

2. The hydraulic cylinder device according to claim 1, wherein
the elastic member is a coil spring;
the support member has a recess which sinks from an end face on the one chamber of the chambers side, and in which the other end portion of the coil spring is disposed; and
the through hole of the support member communicates between an interior of the recess and the exterior.

3. The hydraulic cylinder device according to claim 2, wherein
an edge of the recess has an internal diameter gradually smaller from the one chamber of the chambers side toward the exterior side.

4. The hydraulic cylinder device according to claim 3, wherein
an external diameter of the protruding portion in a radial direction of the through hole is smaller on the exterior side than on the one chamber of the chambers side.

5. The hydraulic cylinder device according to claim 3, wherein
the support member has a projection that is provided on an inner side of the coil spring and that projects toward the one chamber of the chambers side from a part of the recess where the coil spring is supported; and
the through hole penetrates the projection.

6. The hydraulic cylinder device according to claim 2, wherein
an external diameter of the protruding portion in a radial direction of the through hole is smaller on the exterior side than on the one chamber of the chambers side.

7. The hydraulic cylinder device according to claim 2, wherein
the support member has a projection that is provided on an inner side of the coil spring and that projects toward the one chamber of the chambers side from a part of the recess where the coil spring is supported; and
the through hole penetrates the projection.

8. The hydraulic cylinder device according to claim 2, wherein
the exterior side of the through hole is gradually larger in hole size from the one chamber of the chambers side toward the exterior side.

9. The hydraulic cylinder device according to claim 1, wherein
an external diameter of the protruding portion in a radial direction of the through hole is smaller on the exterior side than on the one chamber of the chambers side.

10. The hydraulic cylinder device according to claim 1, wherein
the movable member is received in the case so that a flow channel is formed between the movable member and an inner face of the case; and
the through hole of the support member communicates with the flow channel.

11. The hydraulic cylinder device according to claim 10, wherein
the exterior side of the through hole is gradually larger in hole size from the one chamber of the chambers side toward the exterior side.

12. The hydraulic cylinder device according to claim 1, wherein
the exterior side of the through hole is gradually larger in hole size from the one chamber of the chambers side toward the exterior side.

13. The hydraulic cylinder device according to claim 1, wherein
the surface is provided in an upper portion of the support member,
the protruding portion is inserted into a hole provided in the mounted member, and
said hole has a diameter smaller than an external diameter of the upper portion.

14. A hydraulic cylinder device comprising:
a pump that discharges hydraulic fluid;
a valve body disposed so as to partition an inside of a chamber, into which the hydraulic fluid discharged from the pump flows, into chambers so that when pressure in one chamber of the chambers of the chambers on one side of the valve body is higher than pressure in an other chamber of the chambers on the other side of the valve body, the valve body moves from the one side toward the other side;
a first non-return valve that is closed when pressure in a first chamber of a cylinder is higher than pressure in the other chamber of the chambers, and that is open when the pressure in the other chamber of the chambers is higher than the pressure in the first chamber of the cylinder and when the valve body has moved to the other side; and
a second non-return valve that is closed when pressure in a second chamber of the cylinder is higher than pressure in the one chamber of the chambers, and that is open when the pressure in the one chamber of the chambers is higher than the pressure in the second chamber of the cylinder and when the valve body has moved to the one side; wherein
the second non-return valve includes a second movable member, a second elastic member and a second support member, the second movable member moving to open and close one opening portion that is an opening portion on the one chamber of the chambers side in a second case that forms a flow channel from the one chamber of the chambers toward an exterior of the second case, the second elastic member giving force to the second movable member in a direction to close the one opening portion, the second elastic member having one end portion supported by the second movable member, the second support member being disposed to close an opening portion on the exterior side in the second case to support the other end portion of the second elastic member, the second support member having a through hole that serves as a throttle of the flow channel from the one chamber of the chambers toward the exterior,
a sectional area of a flow channel in the through hole is smaller than a sectional area of the one opening portion such that the through hole functions as the throttle, and
the second support member has a surface contacting a mounted member on which the hydraulic cylinder device is mounted, and a protruding portion that protrudes toward the exterior side in an axial direction from the surface.

15. The hydraulic cylinder device according to claim 14, wherein
the first non-return valve includes a first movable member, a first elastic member and a first support member, the first movable member moving to open and close the other opening portion that is an opening portion on the other chamber of the chambers side in a first case that forms a flow channel from the other chamber of the chambers toward the exterior of the first case, the first elastic member giving force to the first movable member in a direction to close the other opening portion, the first elastic member having one end portion supported by the first movable member, the first support member being disposed to close an opening portion on the exterior side in the first case to support the other end portion of the first elastic member, the first support member having a through hole that serves as a throttle for the flow in the flow channel from the other chamber of the chambers toward the exterior.

16. The hydraulic cylinder device according to claim 14, wherein
the surface is provided in an upper portion of the second support member,
the protruding portion is inserted into a hole provided in the mounted member, and
said hole has a diameter smaller than an external diameter of the upper portion.

* * * * *